United States Patent [19]

Maior

[11] 3,983,259
[45] Sept. 28, 1976

[54] FOOD PROCESSING SYSTEM

[75] Inventor: David G. Maior, Detroit, Mich.

[73] Assignee: Campbell Research Corporation, Detroit, Mich.

[22] Filed: June 17, 1974

[21] Appl. No.: 479,758

[52] U.S. Cl. .................................. 426/401; 99/356; 99/368; 99/516; 210/71; 426/510; 426/521
[51] Int. Cl.² ........................................... A23B 7/06
[58] Field of Search .......... 426/397, 399, 401, 407, 426/66, 232, 325, 456, 509, 510, 521; 99/367, 368, 516, 356, 359; 210/62, 71, 73

[56] References Cited
UNITED STATES PATENTS

| 2,935,930 | 5/1960 | Abrams | 99/356 |
| 3,583,910 | 6/1971 | Stoddard | 210/73 X |
| 3,644,129 | 2/1972 | Sloan | 426/456 X |
| 3,664,951 | 5/1972 | Armstrong | 210/62 X |
| 3,701,728 | 10/1972 | Appleman | 210/62 X |
| 3,718,256 | 2/1973 | King | 210/73 X |
| 3,782,453 | 1/1974 | Cates et al. | 261/DIG. 11 X |

OTHER PUBLICATIONS

A Complete Course in Canning (9th Edition), The Canning Trade of Baltimore, Md., 1969, pp. 111–116.

Primary Examiner—Frank W. Lutter
Assistant Examiner—William Cuchlinski, Jr.
Attorney, Agent, or Firm—Barnes, Kisselle, Raisch & Choate

[57] ABSTRACT

A food processing system wherein food is successively treated by washing, blanching, and is thereafter canned and the cans are subjected to retorting, wherein the water, fuel and electrical energy utilized are conserved by efficient utilization thereof. More specifically, the method and apparatus provide for drawing water from a source, passing the water thereafter through a water softener, thereafter passing the water through an electrostatic device to inactivate components such as calcium, magnesium, salts and carbonates and prevent them from precipitating, and thereafter utilizing a portion of the water from the electrostatic device for the retort area, the can filling area, and the spraying of the product after removal from blanching, heating the water passing to the can filling area by heat exchange relation with steam, treating another portion of the water from the electrostatic device with chlorine sufficient to substantially reduce the undesirable bacteria to a predetermined level and passing the chlorinated portion to the blancher and the washer, continuously circulating the water in the retort area through a cooling tower spaced from the retort area, and maintaining the ph of the water in the retort area.

10 Claims, 2 Drawing Figures

FOOD PROCESSING SYSTEM

This invention relates to food processing systems.

BACKGROUND OF THE INVENTION

In the handling of food in processing and canning, the major consideration is one of health, that is, that the food not be contaminated. Thus, it is common to include in the food processing system washers, blanchers, and steam-heated retorts. In addition, the retorts are arranged for quick cooling of the containers after retorting to prevent the occurrence of micro-organisms and growth thereof. Such systems require large quantities of water and fuel.

Another object of food processing is to provide and attractive appearance to the food. In other words, in order to manufacture food which would be visually appetizing, discoloration is to be avoided.

With emphasis being placed on conservation of natural resources and energy, the importance of the most efficient usage and utilization of water and fuel has become more critical, with demand exceeding supply.

Accordingly, among the objects of the invention are to provide a food processing system which utilizes water and fuel with the utmost efficiency, resulting in an appetizing appearing product, decreasing the cost of manufacturing the product by use of previously expended energy which is customarily lost in conventional systems and the return of waste water to the ground in a safe re-usable condition.

SUMMARY OF THE INVENTION

A food processing system wherein food is successively treated by washing, blanching, and is thereafter canned and the cans are subjected to retorting, wherein the water, fuel and electrical energy utilized are conserved by efficient utilization thereof.

DESCRIPTION

Figure 1:
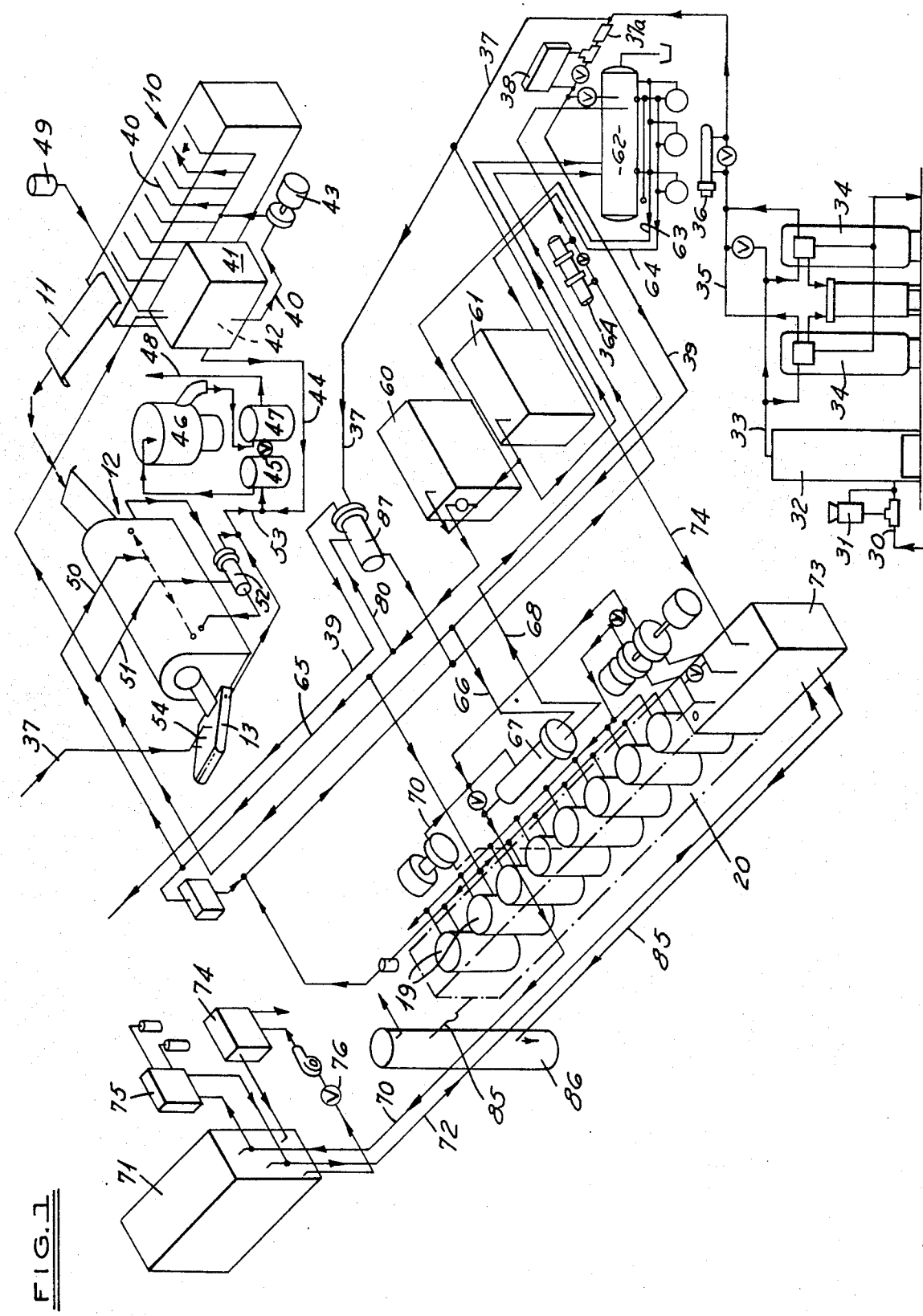
FIG. 1 is a perspective schematic of a system embodying the invention.
Figure 2:
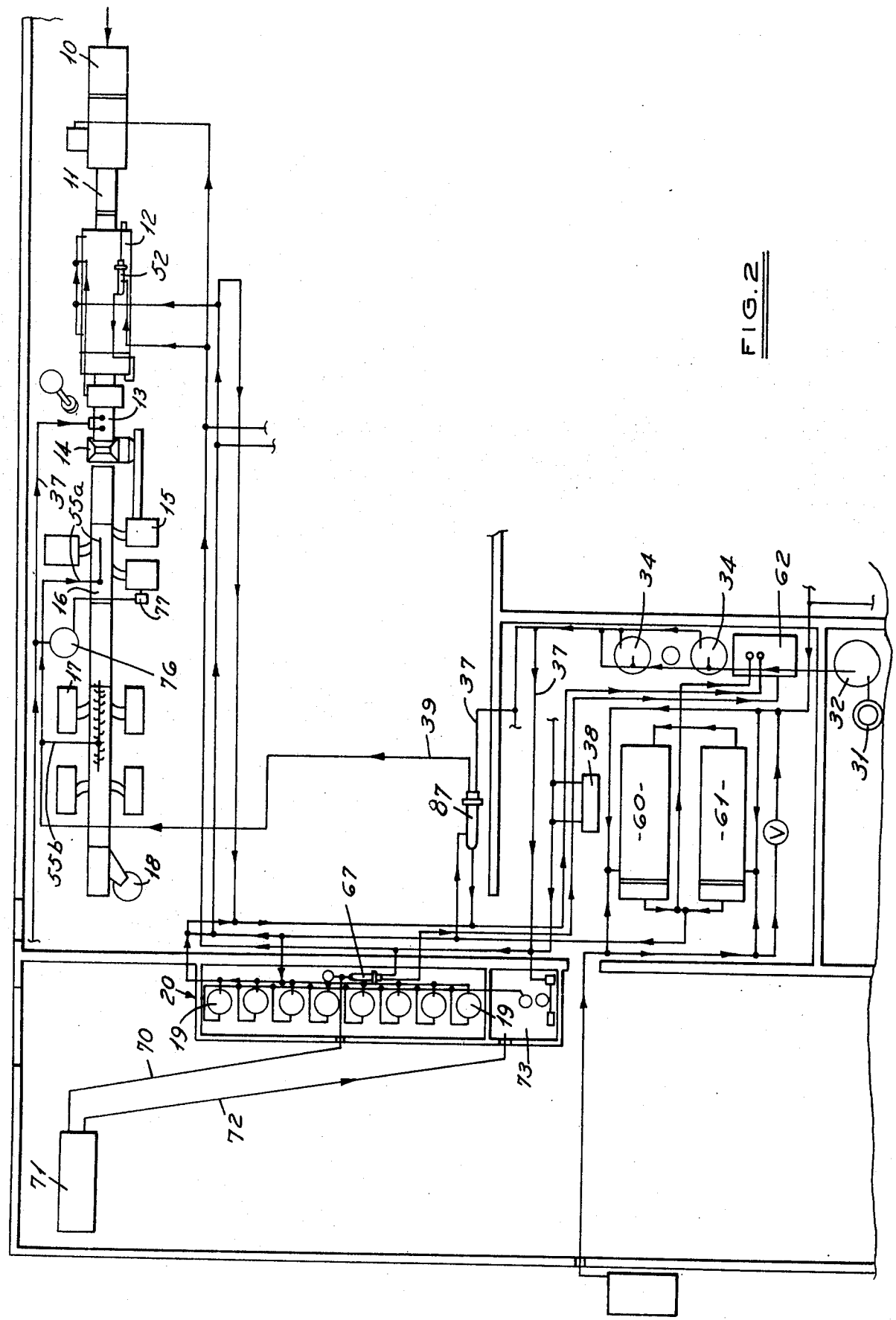
FIG. 2 is a plan schematic.

The food processing system embodying the invention is described in connection with a plant located at a remote area wherein the water being used is well water and natural and/or liquid gas is used as an energy source. However, as will be apparent, the system is also applicable to areas utilizing municipally treated water and oil or other fuel. The invention is more specifically described in connection with the processing of mushrooms which are among the most difficult to process and can, from the standpoint of elimination of micro-organisms and maintenance of an appetizing appearance, and the reclamation of expendible energy, cost saving in its manufacture and conservation.

GENERAL DESCRIPTION

Referring to the drawings, the food being processed, such as mushrooms, are introduced into a flotation washer 10 where they are subjected to washing by water and then removed by a conveyor 11 and delivered to a blancher 12 wherein they are subjected to steam and hot water pasteurization and blanching, and pass to a motorized conveyor 13 and, in turn, to a slicer 14. From the slicer 14, the sliced mushrooms are delivered to can-filling machines 15 and thereafter by conveyor 16 to can-sealing machines 17. The filled and sealed cans are then delivered to baskets 18 and manually carried to retorts 19 positioned in a water well 20. In the retorts 19, the cans are first subjected to steam for a predetermined period of time to cook and destroy micro-organisms and thereafter are quickly cooled to a predetermined degree in the retorts whereupon they are removed. Alternatively, the filled and sealed cans may be delivered automatically to and through a retort area where they are subjected to steam and then quickly cooled.

GENERAL WATER TREATMENT

Water from the well is passed through a water line 30 through a metering chlorinator 31 whereby the water is chlorinated at a low level, preferably on the order of 2 parts per million. The water is delivered to a hydropneumatic tank 32 and thereafter passes through a line 33 through alternately operable softeners 34 which function to remove the iron and solids that are coagulated by the low level of chlorination supplied by chlorinator 31. The softeners 34, in addition, function to remove minerals in the conventional fashion. The water therafter passes through line 35 through an electrostatic unit 36 which functions to inactivate components such as calcium, magnesium, salts and carbonates by preventing them from precipitating. Such electrostatic units are commonly called electrostatic descalers and are made, for example, by Electrostatic Equipment Compnay, Kansas City, Missouri, and DynaJet Corporation, Lenaxa, Kansas. The water from line 35 is then divided into two portions, one going to line 37, referred to herein as potable water, and the other passing through backflow preventer 37a and a second metering chlorinator 38 which functions to add chlorination in raising the level of the chlorination of that portion of the water to a higher level on the order of 15 parts per million.

As presently described, the water leaving chlorinator 38 through line 39 is delivered to washer 10, blancher 12, and the condensate tank of the steam system.

WASHER

Washer 10 comprises a conventional flotation type washer having a plurality of transversely extending longitudinally spaced pipes with spray nozzles that direct water forwardly in the direction of the arrow so that mushrooms deposited to the mass of water in the tank are subjected to the spray washing and gradually float forward on to the conveyor 11 which lifts them out of the water and delivers them to the blancher 12.

A skimmer 41 having a rotatable screen 42 is associated with the washer 10 and recirculating pump 43 functions to remove the filtered water from the skimmer 41 and deliver it to the pipes 40 thereby providing a circulation. The foreign matter accumulating in the upper surface of the water in the skimmer passes through a pipe 44 to a sump pump 45. The sump pump 45, in turn, delivers the solids and liquid removed therefrom to a separator 46 that separates the solids and delivers the liquid to a sump pump 47 that, in turn, delivers the liquid through a line 48 to a sewage treatment lagoon where it may be retained for biological treatment by aeration prior to ground leaching.

Water for replenishing the level in the washer 10 is supplied from line 39. The replenished water is further chlorinated by chlorinator 49 at the rate of 15 parts per million.

BLANCHER

The mushrooms delivered to the blancher 12 are subjected to steam blanching and controlled hot water pasteurization in the blancher which contains a body of water through which steam is supplied by a pipe 50 as presently described.

Water to the blancher unit 12 is supplied from line 39 and line 51. Before entering the blancher, the cold water is preheated by the discharged waste water from the blancher in a converter 52. The spent water discharged from the converter 52 passes through a pipe 53 then to sump pump 45 and separator 46, separating solids and liquids, to sump pump 47 that delivers the liquid through line 48 to sewage treatment lagoon.

The mushrooms passing out of the blancher 12 onto the conveyor 13 are subjected to a plurality of sprays from spray heads 54 supplied with potable water from the line 37, that is, the water with metered chlorination having 2 ppm chlorine.

Where the blanchers are of the type that do not use hot water but only steam passing to the water in the blancher, the discharged waste water from the blancher can be utilized for heat transfer in a converter such as converter 52 to other water utilized in the plant.

The heated potable water from line 37 is also utilized in the can fill area through line 55a and 55b. Cold potable water from line 37 is also utilized and passes through the brine fill tank 76 and, in turn, to the brine pump 77 that supplies brine to the unsealed containers.

STEAM GENERATION

Steam is generated by one or more boilers 60, 61 which can be operated individually, alternatively or simultaneously in accordance with the steam load requirements. The boilers receive electrostatically controlled chlorinated boiler feed water from a condensate tank 62 through lines 63, 64, and the steam emanating therefrom in line 65 passes to the blancher 12 through line 50 as heretofore described as well as to the retorts 19.

A portion of the water from line 39 having 15 ppm chlorine passes through a line 66 to a heat exchanger or converter 67 and discharges through a line 68 to the condensate tank 62. The water surrounding the heat exchanger or converter 67 is the water circulated from the hot well 20. The water in hot well 20 is continuously circulated by removal from hot well 20 through line 70 to a cooling tower 71 and return in line 72 to a cold well 73.

The make-up water is replenished as required from line 37 through line 74. Overflow is removed through line 85 and sump pump 86. The cooling tower includes a ph control unit 75 which functions to add chlorine or acid in order to maintain the desired ph level of 2 ppm chlorine residual. By controlling the chlorine content so that there is at least some chlorine present, contamination is prevented from spilled product and the like. By maintaining the chlorine level below maximum level, metal discoloration of the container or closure is prevented.

A liquid separator 74 removes sludge and solids continuously passing in line 76. In this manner, sludge is not returned to the well.

In this manner, no additional chemicals are needed in the cooling water system. Hot water is provided to the can fill station by passing a portion of the steam through line 80 and a heat exchanger or converter 87 in heat exchange relationship with a portion of potable water from line 37. This heated water passes through line 38.

In operation, the mushrooms are fed continuously through the washer, blancher, canning, can sealing, and retort areas and throughout these operations, the amount of water utilized is maintained at a minimum because of the fact that the water is only treated with chlorine and therefore can be used both in treatment of the food product as well as the sealed container. Heat is conserved by the various heat exchanges that occur in portions of the system thereby conserving fuel and since less water is required, electrical energy is also conserved in the operation of the pumps. Since the water emanating from the system has minimal chemicals, it requires less land for aerating lagoons and the like. The use of minimum additives or chemicals also preserves equipment life. Thus, the system is not only ecologically more efficient but is also more economical.

I claim:

1. In the method of processing food products and the like utilizing water and steam wherein the product is first washed, then blanched with steam in a blancher, sprayed after removal from the blancher in a washer, canned in containers in a can filling area, the cans are then retorted under steam pressure in a retort area, and finally the cans are cooled with water in the retort area, the steps comprising drawing water from a source, passing the water thereafter through a water softener, thereafter passing the water through an electrostatic device to inactivate components such as calcium, magnesium, salts and carbonates and prevent them from precipitating, and thereafter utilizing a portion of said water from said electrostatic device for the retort area, the can filling area, and the spraying of the product after removal from blanching, heating said water and passing to said can filling area by heat exchange relation with steam, treating another portion of the water from the electrostatic device with chlorine sufficient to substantially reduce the undesirable bacteria to a predetermined level and passing said chlorinated portion to the blancher and the washer, continuously circulating said water in said retort area through a cooling tower spaced from said retort area, and maintaining the ph of said water in the retort area at a predetermined level sufficient to prevent contamination and insufficient to cause discoloration of the containers.

2. The method set forth in claim 1 including passing the condensate from said steam from said heat exchange step to a condensate tank, and moving said water passing to said condensate tank in heat exchange relationship to water from said retort area.

3. The method set forth in claim 1 including moving said water passing to said blancher into heat exchange relationship with heated water in said blancher.

4. The method set forth in claim 1 including treating the water with chlorine to produce a low level of chlorination sufficient to coagulate the iron and solids before passage to the water softener such that the water softener functions to remove the coagulated iron and solids.

5. The method set forth in claim 1 including desludging the water from the cooling tower to the retort area.

6. In the method of processing food products and the like utilizing water and steam wherein the product is first washed, then balanced with steam in a blancher area, sprayed after removal from the blancher in a washer area, canned in a container in a can filling area, the cans are then retorted under steam pressure in a retort area, and finally the cans are cooled with water, the steps comprising drawing water from a source,
treating the water from said source with chlorine to produce a low level of chlorination sufficient to coagulate the iron and solids,
passing the chlorinated water thereafter through a water softener,
thereafter passing the water from said water softener through an electrostatic device to inactivate components such as calcium, magnesium, salts and carbonates and prevent them from precipitating,
and thereafter utilizing a portion of said water from said electrostatic device for the retort area, the can filling area, and the spraying of the product after removal from blanching,
heating said water passing to said can filling area by heat relation with steam,
passing the condensate from the steam to a condensate tank,
treating another portion of the water from the electrostatic device with chlorine sufficient to substantially reduce the undesirable bacteria to a predetermined level and passing to the blancher and the washer,
moving said water passing to said condensate tank in heat exchange relationship with water from said retort area,
moving said water passing to said blancher into heat exchange relationship with said heated water in said blancher,
continuously circulating said water in said retort area through a cooling tower spaced from said retort area,
and maintaining the ph of said water in the retort area at a predetermined level sufficient to prevent contamination and insufficient to cause discoloration of the containers.

7. In apparatus for processing food products and the like utilizing water and steam wherein the product is first washed, then blanched with steam, canned in a container, the cans are then retorted under steam pressure in a retort, and finally the cans are cooled with water, the combination comprising means for drawing water from a source,
a water softener,
means for passing the water thereafter through said water softener,
and electrostatic device,
means for thereafter passing the water through an electrostatic device,
a blancher,
a washer,
a can filling apparatus,
a retort,
and means for thereafter utilizing a portion of said water for the retort, the can filling apparatus, the blancher, and the washer for spraying of the product after removal from blanching,
a first heat exchanger,
means for passing said water to said can filling apparatus in heat exchange relation with steam in said first heat exchanger,
a condensate tank to which steam passes,
means for treating another portion of the water from the electrostatic device with chlorine sufficient to substantially reduce the undesirable bacteria to a predetermined level and passing said water to the blancher, condensate tank, and the washer,
a cooling tower,
means for continuously circulating said water in said retort area through said cooling tower,
and means for maintaining the ph of said water to the retort area at a predetermined level sufficient to prevent contamination and insufficient to cause discoloration of the containers.

8. The combination set forth in claim 7 including a second heat exchanger,
means for passing said water to said condensate tank through said second heat exchanger in heat exchange relationship with water from said retort area.

9. The combination set forth in claim 7 including a third heat exchanger,
means for moving said water passing to said blancher through said third heat exchanger into heat exchange relationship with the water from said blancher.

10. The combination set forth in claim 7 including means for treating the water with chlorine before passage to the water softener to produce a low level of chlorination sufficient to coagulate the iron and solids such that the water softener functions to remove the coagulated iron and solids.

* * * * *